United States Patent
Tilbrook et al.

(10) Patent No.: US 8,097,333 B2
(45) Date of Patent: *Jan. 17, 2012

(54) COMPOSITE MATERIALS WITH BLEND OF THERMOPLASTIC PARTICLES

(75) Inventors: David Tilbrook, Saffron (GB); Dana Blair, Hardwick (GB); Maureen Boyle, Castro Valley, CA (US); Paul Mackenzie, Purley (GB)

(73) Assignees: Hexcel Corporation, Dublin, CA (US); Hexcel Composites, Ltd., Duxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,473

(22) Filed: Mar. 7, 2011

(65) Prior Publication Data

US 2011/0147670 A1 Jun. 23, 2011

Related U.S. Application Data

(63) Continuation of application No. 12/792,338, filed on Jun. 2, 2010, now Pat. No. 7,923,102, which is a continuation of application No. 11/787,701, filed on Apr. 17, 2007, now Pat. No. 7,754,322.

(30) Foreign Application Priority Data

Oct. 2, 2006 (GB) .................................. 0619401.3

(51) Int. Cl.
| | |
|---|---|
| B32B 27/04 | (2006.01) |
| B32B 27/18 | (2006.01) |
| B32B 27/20 | (2006.01) |
| B32B 27/34 | (2006.01) |
| B32B 27/38 | (2006.01) |
| C08L 63/00 | (2006.01) |
| C08L 63/02 | (2006.01) |

(52) U.S. Cl. ............. 428/297.4; 428/413; 428/415; 428/417; 523/400; 525/523; 525/524; 525/525; 525/526

(58) Field of Classification Search .................. None
See application file for complete search history.

(56) References Cited

U.S. PATENT DOCUMENTS

| | | | |
|---|---|---|---|
| 6,429,157 B1 * | 8/2002 | Kishi et al. ............... | 442/227 |
| 7,754,322 B2 * | 7/2010 | Tilbrook et al. ........... | 428/297.4 |
| 7,923,102 B2 * | 4/2011 | Tilbrook et al. ........... | 428/297.4 |

* cited by examiner

*Primary Examiner* — Michael J Feely
(74) *Attorney, Agent, or Firm* — W. Mark Bielawski; David J. Oldenkamp

(57) ABSTRACT

Pre-impregnated composite material (prepreg) is provided that can be cured to form composite parts that have high levels of damage tolerance. The matrix resin includes a thermoplastic particle component that is a blend of particles that have a melting point above the curing temperature and particles that have a melting point at or below the curing temperature.

22 Claims, No Drawings

COMPOSITE MATERIALS WITH BLEND OF THERMOPLASTIC PARTICLES

This application is a continuation of U.S. patent application Ser. No. 12/792,338 (now U.S. Pat. No. 7,923,102), filed on Jun. 02, 2010, which is a continuation of U.S. patent application Ser. No. 11/787,701 (now U.S. Pat. No. 7,754,322), filed on Apr. 17, 2007.

BACKGROUND OF THE INVENTION

1. Field of the Invention

The present invention relates generally to pre-impregnated composite material (prepreg) that is used in making high performance composite parts. More particularly, the invention is directed to providing prepreg that may be cured/molded to form composite parts having high strength, damage tolerance and interlaminar fracture toughness.

2. Description of Related Art

Composite materials are typically composed of a continuous resin matrix and reinforcing fibers as the two primary constituents. The composite materials are often required to perform in demanding environments, such as in the field of aerospace where the physical limits and characteristics of composite parts is of critical importance.

Pre-impregnated composite material (prepreg) is used widely in the manufacture of composite parts. Prepreg is a combination of an uncured resin matrix and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network have a large affect on the structural properties of the part. Prepreg is a preferred material for use in manufacturing load-bearing structural parts and particularly aerospace composite parts, such as wings, fuselages, bulkheads and control surfaces. It is important that these parts have sufficient strength, damage tolerance and other requirements that are routinely established for such parts.

The fiber reinforcements that are commonly used in aerospace prepreg are multidirectional woven fabrics or unidirectional tape that contains fibers extending parallel to each other. The fibers are typically in the form of bundles of numerous individual fibers or filaments that are referred to as a "tows". The fibers or tows can also be chopped and randomly oriented in the resin to form a non-woven mat. These various fiber reinforcement configurations are impregnated with a carefully controlled amount of uncured resin. The resulting prepreg is typically placed between protective layers and rolled up for storage or transport to the manufacturing facility.

Prepreg may also be in the form of short segments of chopped unidirectional tape that are randomly oriented to form a non-woven mat of chopped unidirectional tape. This type of pre-preg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The tensile strength of a cured composite material is largely dictated by the individual properties of the reinforcing fiber and matrix resin, as well as the interaction between these two components. In addition, the fiber-resin volume ratio is an important factor. Cured composites that are under tension tend to fail through a mechanism of accumulated damage arising from multiple tensile breakages of the individual fiber filaments located in the reinforcement tows. Once the stress levels in the resin adjacent to the broken filament ends becomes too great, the whole composite can fail. Therefore, fiber strength, the strength of the matrix, and the efficiency of stress dissipation in the vicinity of broken filament ends will contribute to the tensile strength of a cured composite material.

In many applications, it is desirable to maximize the tensile strength property of the cured composite material. However, attempts to maximize tensile strength can often result in negative effects on other desirable properties, such as the compression performance and damage tolerance of the composite structure. In addition, attempts to maximize tensile strength can have unpredictable effects on the tack and out-life of the prepreg. The stickiness or tackiness of the uncured prepreg is commonly referred to as "tack". The tack of uncured prepreg is an important consideration during lay up and molding operations. Prepreg with little or no tack is difficult to form into laminates that can be molded to form structurally strong composite parts. Conversely, prepreg with too much tack can be difficult to handle and also difficult to place into the mold. It is desirable that the prepreg have the right amount of tack to insure easy handling and good laminate/molding characteristics. In any attempt to increase strength and/or damage tolerance of a given cured composite material, it is important that the tack of the uncured prepreg remain within acceptable limits to insure suitable prepreg handling and molding.

The "out-life" of prepreg is the length of time that the prepreg may be exposed to ambient conditions before undergoing an unacceptable degree of curing. The out-life of prepreg can vary widely depending upon a variety of factors, but is principally controlled by the resin formulation being used. The prepreg out-life must be sufficiently long to allow normal handling, lay up and molding operations to be accomplished without the prepreg undergoing unacceptable levels of curing. In any attempt to increase strength and/or damage tolerance of a given cured composite material, it is important that the out-life of the uncured prepreg remain as long as possible to allow sufficient time to process, handle and lay up the prepreg prior to curing.

The most common method of increasing composite tensile performance is to change the surface of the fiber in order to weaken the strength of the bond between matrix and fiber. This can be achieved by reducing the amount of electro-oxidative surface treatment of the fiber after graphitization. Reducing the matrix fiber bond strength introduces a mechanism for stress dissipation at the exposed filament ends by interfacial de-bonding. This interfacial de-bonding provides an increase in the amount of tensile damage a composite part can withstand before failing in tension.

Alternatively, applying a coating or "size" to the fiber can lower the resin-fiber bond strength. This approach is well known in glass fiber composites, but can also be applied to composites reinforced with carbon fibers. Using these strategies, it is possible to achieve significant increases in tensile strength. However, the improvements are accompanied by a decrease in properties, such as compression after impact (CAI) strength, which requires high bond strength between the resin matrix and fibers.

Another alternative approach is to use a lower modulus matrix. Having a low modulus resin reduces the level of stress that builds up in the immediate vicinity of broken filaments. This is usually achieved by either selecting resins with an intrinsically lower modulus (e.g. cyanate esters), or by incorporating an ingredient such as an elastomer (carboxy-terminated butadiene-acrylonitrile [CTBN], amine-terminated butadiene-acrylonitrile [ATBN] and the like). Combinations of these various approaches are also known.

Selecting lower modulus resins can be effective in increasing composite tensile strength. However, this can result in a tendency to damage tolerance, which is typically measured by a decrease in compressive properties, such as compression after impact (CAI) strength and open hole compression (OHC) strength. Accordingly, it is very difficult to achieve a simultaneous increase in both the tensile strength and damage tolerance Multiple layers of prepreg are commonly used to form composite parts that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces. The G2c interlaminar fracture toughness is related to CAI. Prepreg materials that exhibit high damage tolerance also have high CAI and G2c values.

A simple way to increase interlaminar fracture toughness has been to increase the ductility of the matrix resin by introducing thermoplastic sheets as interleaves between layers of prepreg. However, this approach tends to yield stiff, tack-free materials that are difficult to use. Another approach has been to include a tough resin interlayer of about 25 to 30 microns thickness between fiber layers. The prepreg product includes a resin rich surface containing fine, tough thermoplastic particles. For the interlayer-toughened material, even though the initial value of Mode II fracture toughness is about four times as high as that of carbon fiber prepregs without interlayer, the fracture toughness value decreases as the crack propagates and converges at a low value, which is almost the same as that of the non-interleaved system. Ultimately, the average G2c values hit a ceiling as the crack moves from the very tough interlaminar (resin-rich) region of the composite to the less tough intralaminar (fiber) zone.

Although existing prepregs are well suited for their intended use in providing composite parts that are strong and damage tolerant, there still is a continuing need to provide prepreg that may be used to make composite parts that have even higher levels of strength (e.g. tensile strength and compression strength), damage tolerance (CAI) and interlaminar fracture toughness (G1c and G2c).

SUMMARY OF THE INVENTION

In accordance with the present invention, pre-impregnated composite material (prepreg) is provided that can be molded to form composite parts that have high levels of strength, damage tolerance and interlaminar fracture toughness. This is achieved without causing any substantial negative impact upon the physical or chemical characteristics of the uncured prepreg or the cured composite part.

The pre-impregnated composite materials of the present invention are composed of reinforcing fibers and a matrix. The matrix includes a resin component made up of difunctional epoxy resin in combination with a multifunctional aromatic epoxy resin. The matrix further includes a thermoplastic particle component, a thermoplastic toughening agent and a curing agent. As a feature of the present invention, the thermoplastic component is composed of high melting thermoplastic particles and low melting thermoplastic particles. The low melting particles melt during the curing process to provide an increase in damage tolerance and interlaminar toughness that cannot be achieved when the high or low melting thermoplastic particles are used alone.

The present invention also covers methods for making the prepreg and methods for molding the prepreg into a wide variety of composite parts. The invention also covers the composite parts that are made using the improved prepreg.

It has been found that the use of a blend of both high and low melting thermoplastic particles in accordance with the present invention results in the formation of prepreg that may be molded to form composite parts that have improved damage tolerance and interlaminar toughness in comparison to conventional systems.

Additionally, it has surprisingly been found that the benefits of improved damage tolerance and interlaminar toughness can be obtained without substantially affecting the other desirable physical properties of the prepreg (e.g. tack and out-life) or the resultant cured composite material (e.g. matrix-fiber bonding, strength, stress dissipation, compression performance, and the like).

The above described and many other features and attendant advantages of the present invention will become better understood by reference to the following detailed description.

DETAILED DESCRIPTION OF THE INVENTION

The pre-impregnated composite materials (prepreg) of the present invention may be used as a replacement for existing prepreg that is being used to form composite parts in the aerospace industry and in any other application where high structural strength and damage tolerance is required. The invention involves substituting the resin formulations of the present invention in place of existing resins that are being used to make prepreg. Accordingly, the resin formulations of the present invention are suitable for use in any of the conventional prepreg manufacturing and curing processes.

The pre-impregnated composite materials of the present invention are composed of reinforcing fibers and an uncured matrix. The reinforcing fibers can be any of the conventional fiber configurations that are used in the prepreg industry. However, the matrix is a departure from conventional prepreg industry practice. The matrix includes a conventional resin component that is made up of difunctional epoxy resin in combination with at least one multifunctional aromatic epoxy resin with a functionality greater than two. The matrix further includes a thermoplastic particle component, a thermoplastic toughening agent and a curing agent. As will be discussed in detail below, a feature of the present invention is that the thermoplastic particle component includes both high melting thermoplastic particles that have melting points above the cure temperature and low melting thermoplastic particles that have melting points at or below the cure temperature).

It was discovered that the use of a blend of high and low melting thermoplastic particles imparts greater damage tolerance (CAI) and interlaminar toughness to the composite material. This gives rise to an increase in the compression after impact (CAI) performance and interlaminar toughness (G1c and G2c). The matrix resins of the present invention also impart very high tensile strength (e.g. open hole tensile strength—OHT) to the composite material.

The difunctional epoxy resin used to form the resin component of the matrix may be any suitable difunctional epoxy resin. It will be understood that this includes any suitable epoxy resins having two epoxy functional groups. The difunctional epoxy resin may be saturated, unsaturated, cycloaliphatic, alicyclic or heterocyclic. The resin component should make up from 40 to 65 weight percent of the matrix.

Difunctional epoxy resins, by way of example, include those based on: diglycidyl ether of Bisphenol F, Bisphenol A (optionally brominated), glycidyl ethers of phenol-aldehyde adducts, glycidyl ethers of aliphatic diols, diglycidyl ether, diethylene glycol diglycidyl ether, Epikote, Epon, aromatic epoxy resins, epoxidized olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol F. Diglycidyl ether of Bisphenol F is available commercially from Huntsman Advanced Materials (Brewster, N.Y.) under the trade names Araldite GY281 and GY285. A difunctional epoxy resin may be used alone or in any suitable combination with other difunctional epoxies.

The difunctional epoxy resin is present in the range 10 wt % to 40 wt % of the matrix resin. Preferably, the difunctional epoxy resin is present in the range 15 wt % to 25 wt %. More preferably, the difunctional epoxy resin is present in the range 15 wt % to 20 wt %.

The second component of the matrix is one or more epoxy resins with a functionality greater than two. It is preferred that at least one of the multifunctional epoxies has at least one meta-substituted phenyl ring in its backbone. Preferred multifunctional epoxy resins are those that are trifunctional or tetrafunctional. Most preferably, the multifunctional epoxy resin will be a combination of trifunctional and multifunctional epoxies. The multifunctional epoxy resins may be saturated, unsaturated, cycloaliphatic, alicyclic or heterocyclic.

Suitable multifunctional epoxy resins, by way of example, include those based upon: phenol and cresol epoxy novolacs, glycidyl ethers of phenol-aldehyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidized olefins; brominated resins; aromatic glycidyl amines; heterocyclic glycidyl imidines and amides; glycidyl ethers; fluorinated epoxy resins or any combination thereof.

A trifunctional epoxy resin will be understood as having the three epoxy groups substituted either directly or indirectly in a para or meta orientation on the phenyl ring in the backbone of the compound. As mentioned previously, the meta orientation is preferred. A tetrafunctional epoxy resin will be understood as having the four epoxy groups substituted either directly or indirectly in a meta or para orientation on the phenyl ring in the backbone of the compound.

It is also envisaged that the phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetrafunctional epoxy resins include N,N,N',N'-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morrestown, N.J.). Suitable trifunctional epoxy resins, by way of example, include those based upon: phenol and cresol epoxy novolacs; glycidyl ethers of phenol-aldehyde adducts; aromatic epoxy resins; dialiphatic triglycidyl ethers; aliphatic polyglycidyl ethers; epoxidized olefins; brominated resins, aromatic glycidyl amines and glycidyl ethers; heterocyclic glycidyl imidines and amides; glycidyl ethers; fluorinated epoxy resins or any combination thereof.

A preferred trifunctional epoxy resin is triglycidyl meta-aminophenol. Triglycidyl meta-aminophenol is available commercially from Huntsman Advanced Materials (Monthey, Switzerland) under the trade name Araldite MY0600, and from Sumitomo Chemical Co. (Osaka, Japan) under the trade name ELM-120.

Additional examples of suitable multifunctional epoxy resin include, by way of example, N,N,N',N'-tetraglycidyl-4, 4'-diaminodiphenyl methane (TGDDM available commercially as Araldite MY720 and MY721 from Huntsman Advanced Materials (Monthey, Switzerland), or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyphenyl), and methane-based epoxy resin such as Tactix 742 (available commercially from Huntsman Advanced Materials). Other suitable multifunctional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials).

Epoxy resins with a functionality greater than two are present in the range 25 wt % to 45 wt % of the resin matrix. Preferably, a mixture is provided that includes from 20 to 30 wt % trifunctional epoxy resins and from 5 to 15 wt % tetrafunctional epoxy.

The prepreg matrix in accordance with the present invention also includes a thermoplastic particle component that is composed of thermoplastic particles that have a melting point above the intended curing temperature and thermoplastic particles that have a melting point at or below the intended curing temperature. Curing temperatures for epoxy resins in accordance with the present invention are typically between 140° C. and 200° C. Preferred curing temperatures are in the range of 160° C. to 190° C. with curing temperatures of between about 175° C. and 185° C. being particularly preferred. The particles that have a high melting point (i.e. above the curing temperature) are referred to herein as "high melting" thermoplastic particles. The particles that have a low melting point (i.e. at or below the curing temperature) are referred to herein as "low melting" thermoplastic particles. It is preferred that the high melting particles have a melting point that is at least 10° C. higher than the cure temperature. It is preferred that the low melting particles have a melting point that is below the curing temperature and more preferably at least 10° C. below the cure temperature.

The thermoplastic component should include from 20 to 80 wt % high melting thermoplastic particles and from 20 to 80 wt % low melting thermoplastic particles. Preferably, the thermoplastic component will include from 40 to 60 wt % high melting thermoplastic particles and from 40 to 60 wt % low melting thermoplastic particles. More preferably, the high and low melting thermoplastic particles are present in equal amounts.

The thermoplastic particles are polymers, which can be in the form of homopolymers, copolymers, block copolymers, graft copolymers, or terpolymers. The thermoplastic particles may be thermoplastic resins having single or multiple bonds selected from carbon-carbon bonds, carbon-oxygen bonds, carbon-nitrogen bonds, silicon-oxygen bonds, and carbon-sulphur bonds. One or more repeat units may be present in the polymer which incorporate the following moieties into either the main polymer backbone or to side chains pendant to the main polymer backbone: amide moieties, imide moieties, ester moieties, ether moieties, carbonate moieties, urethane moieties, thioether moieties, sulphone moieties and carbonyl moieties. The thermoplastic paritcles can also have a partially cross-linked structure. The particles may be either crystalline or amorphous or partially crystalline.

Suitable examples of thermoplastic particles include, by way of example, polyamides, polycarbonates, polyacetal, polyphenylene oxide, polyphenylene sulphide, polyarylates, polyethers, polyesters, polyimides, polyamidoimides, polyether imides, polysulphones, polyurethanes, polyether sulphones, and polyether ketones. Polyamides are the preferred type of thermoplastic particles. However, other particles may be used provided that they can be provided in both a high melting form and a low melting form.

The polyamide particles may be made from polyamide 6 (caprolactame—PA6), polyamide 12 (laurolactame—PA12), polyamide 11, polyurethane, polymethyl methacrylate, crosslinked polymethyl methacrylate, densified polyethylene sulfone, or any combination thereof. Preferred thermoplastic particles are polyamide particles that have a melting point of between about 140° C. and 240° C. The particles should have particle sizes of below 100 microns. It is preferred that the particles range in size from 5 to 60 microns and more preferably from 10 to 30 microns. It is preferred that the average particle size be around 20 microns. The particles should be substantially spherical. The particles can be made by anionic polymerization in accordance with PCT application WO2006/051222, by coextrusion, precipitation polymerization, emulsion polymerization or by cryogenic grinding. It is preferred that the particles are made by direct polymerization rather than by grinding or precipitation. Suitable polyamide particles that may be used as either high or low melting particles in accordance with the present invention are available commercially from Arkema of France under the trade name Orgasol.

The thermoplastic particle component is present in the range 6 wt % to 20 wt % of the matrix. Preferably, there will be from 3 to 10 wt % high melting thermoplastic particles and from 3 to 10 wt % low melting thermoplastic particles. More preferred is a thermoplastic component that is composed of equal amounts of high and low melting particles and which constitutes from 9 to 14 wt % of the matrix. The amount of low melting particles in the thermoplastic particle component can vary from 10 to 90 weight percent with the high melting particles correspondingly varying from 90 to 10 weight percent of the thermoplastic particle component. A more preferred range is from 25 to 75 weight percent low melting particles with a corresponding variation in high melting particles from 75 to 25 weight percent.

Polyamide particles come in a variety of grades that have different melting temperatures depending upon the particular polyamide, degree of copolymerization and degree of crystallinity. Particles that contain mostly polyamide 6 (PA6) typically have melting points of above 190° C., which is well above typical epoxy prepreg curing temperatures. Accordingly, little if any dissolution of the PA6 particles occurs during cure. Orgasol 1002 D NAT1 (100% PA6 particles having a degree of crystallinity equal to 51%, a glass transition temperature (Tg) of 26° C., a density of 1.15 g/cm$^3$ (ISO 1183), a molecular weight of 60,200 (g/mole)n, a solution viscosity of 0.93 with a melting point of 217° C. and an average particle size of 20 microns) is an example of high melting polyamide particles. Another example of high melting polyamide particles is Orgasol 3202 D Nat 1 which contains PA6/PA12 copolymer particles (80% PA6 and 20% PA12) having a degree of crystallinity equal to 43%, a Tg of 29° C., a density of 1.09 g/cm$^3$ (ISO 1183), a molecular weight of 60,800 (g/mole)n and a solution viscosity of 1.01. The polyamide copolymer particles in Orgasol 3202 D Nat 1 have an average particle size of 20 microns and a melting point of 194° C. The amount of PA12 in the copolymer may be increased above 20%, if desired, provided that the melting point of the particles does not drop below the cure temperature for the matrix and preferably is at least 10° C. above the cure temperature.

Polyamide 12 (PA12) particles and copolymers of PA6 and PA12 that have less than about 70% PA6 have melting temperatures that are below the typical curing temperatures for epoxy prepregs. These types of low melting particles undergo substantial melting at cure temperatures and are reformed into particles as the cured composite is cooled. Preferred low melting polyamide particles are copolymers of PA6 and PA12. For example Orgasol 3502 D Nat 1 is a copolymer of 50% PA12 and 50% PA 6 (Degree of crystallinity—26%, Tg—26° C., density—1.07 g/cm$^3$ (ISO 1183), Molecular Weight—68,200 (g/mole)n, solution viscosity of 1.00) that has a melting point of 142° C. with particle sizes averaging around 20 microns. Further examples of suitable low melting polyamide particles include: 1) Orgasol 3803 DNAT1, which is a copolymer of 80% PA12 and 20% PA6 (Molecular Weight—approx. 54,000 (g/mole)n, solution viscosity of 1.0, that has a melting point of 160° C. with the mean particle size being from 17 to 24 microns with there being less than 5% of the particles with diameters less than 10 microns and less than 10% of the particles with diameters of greater than 30 microns; and 2) development grade Orgasol CG199, which is the same as Orgasol 3803 DNAT1, except that the molecular weight of the copolymer is lower and the solution viscosity is 0.71. The percentage of PA12 and PA6 in the low melting polyamide copolymer particles may be varied above and below the percentages shown for Orgasol 3502 D Nat 1 and Orgasol 3803 D Nat 1 provided that the melting point of the particles remains at or below the cure temperature for the matrix and preferably at least 10° C. below the cure temperature. Some polyamide particles may function as either low or high melting particles depending upon the curing temperature that is selected for the prepreg. For Example, Orgasol 3803 D Nat 1 particles are considered to be high melting particles when the selected curing temperature is below 160° C. However, if the selected curing temperature is at or above 160° C., the Orgasol 3803 D Nat 1 particles are considered to be low melting.

The prepreg matrix resin includes at least one curing agent. Suitable curing agents are those which facilitate the curing of the epoxy-functional compounds of the invention and, particularly, facilitate the ring opening polymerization of such epoxy compounds. In a particularly preferred embodiment, such curing agents include those compounds which polymerize with the epoxy-functional compound or compounds, in the ring opening polymerization thereof. Two or more such curing agents may be used in combination.

Suitable curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylene-tetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amines, including aromatic amines, e.g., 1,3-diaminobenzene, 1,4-diaminobenzene, 4,4'-diamino-diphenylmethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS).

Also, suitable curing agents may include polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Different commercially available compositions may be used as curing agents in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1,3-diaza-2,4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals, Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

The curing agent (s) are selected such that they provide curing of the resin component of the composite material when combined therewith at suitable temperatures. The amount of curing agent required to provide adequate curing of the resin component will vary depending upon a number of factors including the type of resin being cured, the desired curing temperature and curing time. Curing agents typically include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS), both commercially available from Huntsman. The curing agent is present in an amount that ranges from 5 wt % to 45 wt % of the uncured matrix. Preferably, the curing agent is present in an amount that ranges from 10 wt % to 30 wt %. More preferably, the curing agent is present in the range 15 wt % to 25 wt % of the uncured matrix. Most preferred are matrix resins that contain from 16 wt % to 22 wt % curing agent.

4,4'-DDS is a preferred curing agent. It is preferably used as the sole curing agent in amounts ranging from 15 wt % to 25 wt %. The use of substantial amounts of 3,3'-DDS as the curing is not preferred. It is expected that the more reactive 3,3'-DDS will provide increased strength in the neat cured resins, but that the resulting prepregs will have tack properties that are not nearly as good as those using the less reactive 4,4'-DDS. Accordingly, to achieve the optimum balance of prepreg outlife, tack and mechanical performance of the cured composite part, it is preferred that less reactive curing agents, such as 4,4'-DDS and the like, be used at an amine to epoxy stoichiometry of about 70 to 80 percent.

The matrix of the present invention also preferably includes a thermoplastic toughening agent. Any suitable thermoplastic polymers may be used as the toughening agent. Typically, the thermoplastic polymer is added to the resin mix as particles that are dissolved in the resin mixture by heating prior to addition of the curing agent. Once the thermoplastic agent is substantially dissolved in the hot matrix resin precursor (i.e. the blend of epoxy resins), the precursor is cooled and the remaining ingredients (curing agent and insoluble thermoplastic particles) are added.

Exemplary thermoplastic toughening agents/particles include any of the following thermoplastics, either alone or in combination: polyamides, copolyamides, polyimides, aramids, polyketones, polyetheretherketones, polyesters, polyurethanes, polysulphones, polyethersulfones, high performance hydrocarbon polymers, liquid crystal polymers, PTFE, elastomers, and segmented elastomers.

Toughening agent is present in the range 45 wt % to 5 wt % of the uncured resin matrix. Preferably, the toughening agent is present in the range 25 wt % to 5 wt %. More preferably, the toughening agent is present in the range 20 wt % to 10 wt %. Most preferably, the toughen agent is present in the range of 13 wt % to 17 wt % of the matrix resin. A suitable toughening agent, by way of example, are PES particles sold under the tradename Sumikaexcel 5003P, which is commercially available from Sumitomo Chemicals. Alternatives to 5003P are Solvay polyethersulphone 105RP, or the non-hydroxyl terminated grades such as Solvay 1054P.

The matrix resin may also include additional ingredients, such as performance enhancing or modifying agents and additional thermoplastic polymers provided they do not adversely affect the tack and outlife of the prepreg or the strength and damage tolerance of the cured composite part. The performance enhancing or modifying agents, for example, may be selected from flexibilizers, toughening agents/particles, accelerators, core shell rubbers, flame retardants, wetting agents, pigments/dyes, UV absorbers, antifungal compounds, fillers, conducting particles, and viscosity modifiers. Suitable additional thermoplastic polymers for use as additional toughening agents include any of the following, either alone or in combination: polyether sulphone (PES), polyether ethersulphone (PEES), polyphenyl sulphone, polysulphone, polyimide, polyetherimide, aramid, polyamide, polyester, polyketone, polyetheretherketone (PEEK), polyurethane, polyurea, polyarylether, polyarylsulphides, polycarbonates, polyphenylene oxide (PPO) and modified PPO.

Suitable accelerators are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea] (e.g. Dyhard UR500 available from Degussa).

Suitable fillers include, by way of example, any of the following either alone or in combination: silicas, aluminas, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon nanotubes and carbon nanofibers. Metal-coated fillers may also be used, for example nickel coated carbon particles and silver coated copper particles.

The matrix resin may include, if desired, an additional non-epoxy thermosetting polymeric resin. Once cured, a thermoset resin is not suitable for melting and remolding. Suitable non-epoxy thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, cyanate ester resins, bismaleimide, vinyl ester, benzoxazine and phenolic resins. If desired, the matrix may include further suitable resins containing phenolic groups, such as resorcinol based resins, and resins formed by cationic polymerization, such as DCPD—phenol copolymers. Still additional suitable resins are melamine-formaldehyde resins, and urea-formaldehyde resins.

The resin matrix is made in accordance with standard preprep matrix processing. In general, the various epoxy resins are mixed together at room temperature to form a resin mix to which the thermoplastic toughening agent is added. This mixture is then heated to a temperature above the melting point of the thermoplastic toughening agent for a sufficient time to substantially melt the toughening agent. The mixture is then cooled down to room temperature or below and the remainder of the ingredients (insoluble thermoplastic particles, curing agent and other additive, if any) are mixed into the resin to form the final matrix resin that is impregnated into the fiber reinforcement.

The matrix resin is applied to the fibrous reinforcement in accordance with any of the known prepreg manufacturing techniques. The fibrous reinforcement may be fully or partially impregnated with the matrix resin. In an alternate embodiment, the matrix resin may be applied to the fiber fibrous reinforcement as a separate layer, which is proximal to, and in contact with, the fibrous reinforcement, but does not substantially impregnate the fibrous reinforcement. The prepreg is typically covered on both side with a protective film and rolled up for storage and shipment at temperatures that are typically kept well below room temperature to avoid premature curing. Any of the other prepreg manufacturing processes and storage/shipping systems may be used if desired.

The fibrous reinforcement of the prepreg may be selected from hybrid or mixed fiber systems that comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. It is envisaged that use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tapes, tow-pregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

An exemplary preferred matrix resin includes from 15 wt % to 20 wt % Bisphenol-F diglycidyl ether; from 20 wt % to 30 wt % triglycidyl-m-aminophenol (trifunctional epoxy resin); from 5 to 15 wt % tetrafunctional para-glycidyl amine; from 15 wt % to 25 wt % diaminodiphenylsulphone (primarily 4,4-DDS as a curing agent); from 3 wt % to 10 wt % high melting polyamide particles (Orgasol 1002D Nat 1); from 3 w % to 10 wt % low melting polyamide particles (Orgasol 3803D Nat 1), and from 10 wt % to 20 wt % poly(ether sulphone) as a toughening agent.

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The composite material may more preferably be cured using a method selected from UV-visible radiation, microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful in many other high performance composite applications including automotive, rail and marine applications where high tensile strength, compressive strength, interlaminar fracture toughness and resistance to impact damage are needed.

In order that the present invention may be more readily understood, reference will now be made to the following background information and examples of the invention.

EXAMPLE 1

A preferred exemplary resin formulation in accordance with the present invention is set forth in TABLE 1. A matrix resin was prepared by mixing the epoxy ingredients at room temperature with the polyethersulfone to form a resin blend that was heated to 130° C. for 60 minutes to completely dissolve the polyethersulfone. The mixture was cooled to 80° C. and the rest of the ingredients added and mixed in thoroughly.

TABLE 1

| Amount (Wt %) | Ingredient |
|---|---|
| 17.30 | Bisphenol-F diglycidyl ether (GY285) |
| 26.15 | Trifunctional meta-glycidyl amine (MY0600) |
| 10.46 | Tetrafunctional para-glycidyl amine (MY721) |
| 20.90 | Aromatic diamine curative (4,4-DDS) |
| 15.69 | Toughener (Sumikaexcel 5003P polyether sulfone) |
| 4.75 | High melting polyamide particles (Orgasol 1002 D Nat 1) |
| 4.75 | Low melting polyamide particles (Orgasol 3803 D Nat 1) |

Exemplary prepreg was prepared by impregnating one or more layers of unidirectional carbon fibers with the resin formulation of TABLE 1. The unidirectional carbon fibers were used to make a prepreg in which the matrix resin amounted to 35 weight percent of the total uncured prepreg weight and the fiber a real weight was 190 grams per square meter (gsm). A variety of prepreg lay ups were prepared using standard prepreg fabrication procedures. The prepregs were cured in an autoclave at 180° C. for about 2 hours. The cured prepregs were then subjected to standard tests to determine their tensile strength, tolerance to damage interlaminar fracture toughness as described below.

In-plane shear modulus (IPM) was determined at room temperature using an 4-ply laminate with configuration (45, −45, −45, 45). The laminate was cured for 2 hours at 180° C. in an autoclave and gave a nominal thickness of 0.75 mm. Consolidation was verified by C-scan. The specimens were cut and tested according to Boeing BMS 8-276 and cited Boeing methods. Results quoted are not normalized.

Compression after Impact (CAI) after a 270 in-lb impact was determined using a 24-ply quasi-isotropic laminate. The laminate was cured at 180° C. for 2 hours in the autoclave. The final laminate thickness was about 4.5 mm. The consolidation was verified by c-scan. The specimens were machined, impacted and tested in accordance with Boeing test method BSS7260 per BMS 8-276. Values are normalized to a nominal cured laminate thickness of 0.18 inches.

Open hole compression (OHC) was determined at room temperature using a 16-ply quasi-isotropic laminate. The laminate was cured for 2 hours at 180° C. in an autoclave and gave a nominal thickness of 3 mm. Consolidation was verified by C-scan. The specimens were machined and tested in accordance with Boeing test method BMS BSS 7260 per BMS 8-726. Values are normalized to a nominal cured laminate thickness of 0.12 inch.

Open hole tension (OHT) was determined at room temperature using a 16-ply quasi-isotropic laminate. The laminate was cured for 2 hours at 180° C. in an autoclave and gave a nominal thickness of 1.5 mm. Consolidation was verified by C-scan. The specimens were machined and tested in accordance with Boeing test method BSS 7260 per BMS 8-276. Values are normalized to a nominal cured laminate thickness of 0.06 inch.

G1c and G2c are standard tests that provide a measure of the interlaminar fracture toughness of the cured laminate. G1c and G2c were determined as follows. A 20-ply unidirectional laminate was cured with a 3 inch fluoroethylene polymer (FEP) film inserted along one edge, at the midplane of the layup, perpendicular to the fiber direction to act as a crack starter. The laminate was cured for 2 hours at 180° C. in an autoclave and gave a nominal thickness of 3.8 mm. Consolidation was verified by C-scan. Both G1c and G2c were machined from the same cured laminate. G1c was tested in accordance with Boeing test method BSS7273 and G2c was tested in accordance with BMS 8-276. Values for G1c and G2c were not normalized.

The cured prepreg had an IPM of about 0.7 msi. The OHT was 72.2 ksi with the OHC and CAI being 45.0 ksi and 55.7 ksi, respectively. G1c was 2.4 in-lb/in$^2$ and G2c was 12.9 in-lb/in$^2$.

A second exemplary prepreg was made, cured and tested in the same manner as set forth above, except that the amounts of Orgasol 1002 and 3803 were changed so that there was 75 wt % Orgasol 1002 in the thermoplastic particle component and 25 wt % Orgasol 3803. This exemplary prepreg had an OHC of 43.5 ksi and a CAI of 53.3 ksi. G1c was 2.2 in-lb/in$^2$ and G2c was 11.6 in-lb/in$^2$.

A comparative prepregs (1C1 and 1C2) were made and tested in the same manner as the above-described preferred exemplary prepreg. 1C1 and 1C2 were identical to the exemplary prepreg, except that 13.5 (1C1) and 9.5 (1C2) weight percent of the high melting Orgasol 1002 DNAT1 polyamide 6 particles were used instead of a blend of high and low melting polyamide particles. The resulting cured prepreg for 1C1 had an IPS modulus of about 0.70 msi. The OHT was 74.8 ksi with the OHC and CAI being 44.4 ksi and 47.4 ksi, respectively. G1c was 2.1 in-ln/in$^2$ and G2c was 6.7 in-lb/in$^2$. For 1C2, OHC was 44.2 ksi and CAI was 52.8 ksi. G1c was 1.9 in-lb/in$^2$ and G2c was 10.9 in-lb/in$^2$.

The above example demonstrates that an unexpected substantial increase in damage tolerance and interlaminar fracture toughness occurs when a blend of high and low melting polyamide particles are used in place of high melting polyamide particles. In addition, this increase in both interlaminar fracture toughness and damage tolerance was achieved without adversely affecting the outlife and tack of the prepreg or the other physical/chemical properties of the cured part.

EXAMPLE 2

Additional exemplary prepregs (2a-2c) were prepared and cured in the same manner as Example 1. These prepregs used different epoxy resin formulations in which the blends of high and low melting polyamide particles were varied both in type and/or amount. The prepregs were prepared using a different carbon fiber. The prepregs contained 35% resin by weight and had a fiber a real weight of 268 gsm. The formulations used for these exemplary prepregs are set forth in TABLE 2.

TABLE 2

| Component (wt %) | 2a | 2b | 2c |
|---|---|---|---|
| GY281 | 24.8 | 24.8 | 26.19 |
| MY0600 | 28.03 | 28.03 | 29.6 |
| PES 5003P | 15.0 | 15.0 | 15.0 |
| 4,4-DDS | 18.66 | 18.66 | 19.7 |
| Orgasol 1002 DNAT1 | 6.75 | 6.75 | 4.75 |
| Orgasol 3502 DNAT1 | | 6.75 | 4.75 |
| Orgasol 3803 DNAT1 | 6.75 | | |

The cured prepregs were tested according to Airbus AITM methods. The results are set forth in TABLE 3.

TABLE 3

|  | 2a | 2b | 2c |
|---|---|---|---|
| IPS (ksi) | 14.9 | 16.8 | 17.0 |
| IPM (msi) | 0.73 | 0.73 | 0.73 |
| OHT (ksi) | 104.6 | 120.5 | — |
| OHC (ksi) | 54.4 | 60.2 | 57.9 |
| CAI (ksi) | 47.3 | 49.3 | 48.3 |

The mechanical properties for the compositions of TABLE 2, which are specified in TABLE 3 were determines as follows:

In-plane shear strength (IPS) and modulus (IPM) were determined at room temperature using an 8-ply laminate with configuration (45, −45, 45, −45) The laminate was cured for 2 hours at 180° C. in an autoclave and gave a nominal thickness of 2 mm. Consolidation was verified by C-scan. The specimens were cut and tested according to Airbus test method AITM 1.0002. Results quoted are not normalized.

Compression after Impact (CAI) after a 270 in-lb impact was determined using a 16-ply quasi-isotropic laminate. The laminate was cured at 180° C. for 2 hours in the autoclave. The final laminate thickness was about 4 mm. The consolidation was verified by c-scan. The specimens were cut and tested in accordance with Airbus test method AITM 1.0010 issue 2, June 1994. The results were normalized at 60% volume fraction based on nominal cure ply thickness as per EN 3784 method B.

Open hole compression (OHC) was determined at room temperature using a 20 ply laminate with 40/40/20 lay-up. The laminate was cured for 2 hours at 180° C. in an autoclave and gave a nominal thickness of 5 mm. Consolidation was verified by C-scan. The specimens were cut up and tested in accordance with Airbus test method AITM 1.0008. Results are values normalized to 60% volume fraction based on nominal cure ply thickness with calculation carried out as per EN 3784 method B.

Open hole tension (OHT) was determined at room temperature using a 20-ply with 40/40/20 lay-up. The laminate was cured for 2 hours at 180° C. in an autoclave and gave a nominal thickness of 5 mm. Consolidation was verified by C-scan. The specimens were cut up and tested in accordance with Airbus test method AITM 1.0008. The results are values that were normalized to 60% volume fraction based on nominal cure ply thickness with calculation carried out as per EN 3784 method B.

The Airbus standard AIMS05-01-002, which cites many of the Airbus test methods (AITM) used for generation of the data in this example, are similar to BMS 8-276, which sets forth the Boeing test methods for primary structure composite materials. However, the Airbus test methods are different and utilize different lay-up and sample dimensions.

Comparative examples 2C1-2C3 were prepared in the same manner as the exemplary prepregs except that a blend of high and low melting polyamide particles was not used. The formulations for these comparative examples are set forth in TABLE 4.

TABLE 4

| Component (wt %) | 2C1 | 2C2 | 2C3 |
|---|---|---|---|
| GY281 | 24.8 | 24.8 | 24.8 |
| MY0600 | 28.0 | 28.0 | 28.0 |
| PES 5003P | 15.0 | 15.0 | 15.0 |
| 4,4-DDS | 18.7 | 18.7 | 18.7 |
| Orgasol 1002 DNAT1 | 13.5 |  |  |
| Orgasol 3502 DNAT1 |  | 13.5 |  |
| Oragasol CG199 |  |  | 13.5 |

The cured comparative prepregs were subjected to the same testing procedures as in Example 2a-2c. The results are set forth in TABLE 5.

TABLE 5

|  | 2C1 | 2C2 | 2C3 |
|---|---|---|---|
| IPS (ksi) | 14.9 | 14.5 | 10.2 |
| IPM (msi) | 0.80 | 0.73 | 0.62 |
| OHT (ksi) | 119.4 | 118.1 | 155.2 |
| OHC (ksi) | 58.3 | 57.2 | 57.0 |
| CAI (ksi) | 41.5-42.5 | 44.7 | 35.2 |

This example demonstrates that an unexpected increase in CAI occurs when blends of high and low melting polyamide particles are used. This increase is achieved without negatively affecting the other properties of both the uncured and cured prepreg. As shown in TABLE 5, the CAI for non-blended formulations of Oragasol 1002, 3502 and CG199 particles (2C1-2C3) are 41.5-42.5, 44.7 and 35.2 ksi, respectively. When the particles are blended together, as in Examples 2a-2c, the resulting CAI's unexpectedly jump to 47.3-49.3 ksi. This is an unexpected advantage that cannot be achieved when using high or low melting particles by themselves.

EXAMPLE 3

Further exemplary (3) and comparative prepregs (3C1 and 3C2) were made in the same manner as Example 1. The same type of carbon fiber was used as for Example 1. However, the fiber a real weight of the prepreg was increased to 268 gsm and the tetrafunctional para-glycidyl amine was dropped from the resin formulation. The formulation for the resins used in this example are set forth in TABLE 6.

TABLE 6

| 3 (Wt %) | 3C1 (Wt %) | 3C2 (Wt %) | Ingredient |
|---|---|---|---|
| 26.19 | 24.80 | 24.80 | Bisphenol-F diglycidyl ether (GY281) |
| 29.60 | 28.03 | 28.03 | Trifunctional meta-glycidyl amine (MY0600) |
| 19.70 | 18.66 | 18.70 | Aromatic diamine curative (4,4-DDS) |
| 15.00 | 15.00 | 15.00 | Toughener (Sumikaexcel 5003P polyether sulfone) |
| 4.75 | 13.00 |  | High melting polyamide particles (Orgasol 1002 D Nat 1) |
| 4.75 | — |  | Low melting polyamide particles (Orgasol 3803 D Nat 1) |
|  |  | 13.5 | High melting polyamide particles (Orgasol 3202 D Nat 1) |

The cured prepregs were subjected to the same testing procedures as in Examples 2a-2c. The results are set forth in TABLE 7.

TABLE 7

|  | 3 | 3C1 | 3C2 |
|---|---|---|---|
| IPS (ksi) | 18.9 | 20.0 | — |
| IPM (msi) | 0.74 | 0.83 | — |
| OHT (ksi) | 100.5 | 98.2 | — |
| OHC (ksi) | 53.7 | 52.7 | 52.9 |
| CAI (ksi) | 55.6 | 51.9 | 52.4 |

This example demonstrates that an unexpected increase in CAI occurs when blends of high and low melting polyamide particles are used. This increase is achieved without negatively affecting the other properties of both the uncured and cured prepreg. It should be noted that the damage tolerance (CAI, OHT and OHC) of the exemplary prepreg (3) was higher than that of the comparative prepreg 3C1, even though there was 4 weight % less polyamide particles present in the matrix resin.

EXAMPLE 4

Comparative prepregs (C4) were made in the same manner as Example 1. The same type of carbon fiber was used. However, the fiber a real weight of the prepreg was increased to 268 gsm and the trifunctional meta-glycidyl amine was replaced with a trifunctional para-glycidyl amine. The resin formulation for these comparative prepregs is set forth in TABLE 8.

TABLE 8

| Amount (Wt %) | Ingredient |
|---|---|
| 22.10 | Bisphenol-F diglycidyl ether (GY285) |
| 10.10 | Trifunctional para-glycidyl amine (MY0510) |
| 21.10 | Tetrafunctional para-glycidyl amine (MY721) |
| 19.20 | Aromatic diamine curative (4,4-DDS) |
| 14.00 | Toughener (Sumikaexcel 5003P polyether sulfone) |
| 13.50 | High melting polyamide particles (Orgasol 1002 D Nat 1) |
| 0.00 | Low melting polyamide particles (Orgasol 3803 D Nat 1) |

The cured comparative prepregs (C4) were subjected to the same testing as in Examples 2a-2c. The cured prepreg (C4) had an IPS of about 15.2 ksi and an IPM of about 0.75 msi. The OHT was 86.2 ksi with the OHC and CAI being 51.8 ksi and 45.5 ksi, respectively.

Exemplary prepreg in accordance with the present invention are made by changing the types and amounts of high and low melting polyamide particles in the thermoplastic particle component of the C4 resin formulation. Exemplary combinations include: 4a) 6.75 wt % Oragsol 1002 D Nat 1 and 6.75 wt % Orgasol 3803 D Nat 1; 4b) 6.75 wt % Oragsol 1002 D Nat 1 and 6.75 wt % Orgasol 3502 D Nat 1; 4c) 6.75 wt % Oragsol 3202 D Nat 1 and 6.75 wt % Orgasol 3803 D Nat 1; and 4d) 6.75 wt % Oragsol 3202 D Nat 1 and 6.75 wt % Orgasol 3502 D Nat 1.

All of the above exemplary prepregs 4a-4-d, when subjected to the same testing as in Examples 2a-2c will show increases in damage tolerance (CAI) when compared to the above results set forth in the comparative example (C4). These increases are achieved without negatively affecting the other physical and chemical properties of the uncured and cured prepreg.

Other exemplary prepreg may be made by varying the relative amounts of the polyamide particles set forth in 4a-4-b and by varying the total amount of polyamide particles in the resin provided that the limitations set forth previously in this detailed description are observed.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A pre-impregnated composite material for curing at a curing temperature, said pre-impregnated composite material comprising:
    A) reinforcing fibers; and
    B) a matrix comprising:
        a) a resin component comprising a difunctional epoxy resin, a trifunctional meta-glycidyl amine and a tetrafunctional para-glycidyl amine;
        b) a thermoplastic particle component comprising high melting thermoplastic particles that have a melting point above said curing temperature and low melting thermoplastic particles that have a melting point at or below said curing temperature;
        d) a thermoplastic toughening agent;
        e) electrically conducting particles; and
        f) a curing agent.

2. A pre-impregnated composite material according to claim 1 wherein said curing temperature is between 140° C. and 200° C.

3. A pre-impregnated composite material according to claim 1 wherein said high melting thermoplastic particles are selected from the group consisting of polyamide 6 and said low melting thermoplastic particles are selected from the group consisting of copolymers of polyamide 6 and polyamide 12.

4. A pre-impregnated composite material according to claim 1 wherein said reinforcing fibers are selected from the group consisting of glass, carbon and aramid.

5. A pre-impregnated composite material according to claim 1 wherein said difunctional epoxy resin is selected from the group consisting of diglycidyl ether of bisphenol F, diglycidyl ether of bisphenol A, diglycidyl dihydroxy naphthalene and combinations thereof.

6. A pre-impregnated composite material according to claim 1 wherein said electrically conductive particles comprise silver, gold, copper, aluminum, nickel, conducting grades of carbon, buckminsterfullerene, carbon nanotubes, carbon nanofibers, nickel coated carbon particles and/or silver coated copper particle.

7. A pre-impregnated composite material according to claim 6 wherein said electrically conducting particles comprise one or more conducting grades of carbon.

8. A pre-impregnated composite material according to claim 1 wherein the amount of said high melting thermoplastic particles in said thermoplastic component is about equal to the amount of said low melting thermoplastic particles in said thermoplastic component.

9. A pre-impregnated composite material according to claim 1 wherein said toughening agent is selected from the group consisting of polyether sulfone, polyether ethersulfone, polyphenyl sulphone, polysulfone, polyimide, polyetherimide, aramid, polyamide, polyester, polyketone, polyetheretherketone, polyurethane, polyurea, polyarylether, polyarylsulphide, polycarbonate and polyphenylene oxide.

10. A pre-impregnated composite material according to claim 1 wherein said curing agent is an aromatic amine.

11. A composite part that comprises a pre-impregnated composite material according to claim 1 wherein said matrix has been cured at said curing temperature.

12. A method for making a composite part comprising the step of curing a pre-impregnated composite material according to claim 1 at said curing temperature.

13. A method for making a pre-impregnated composite material for curing at a curing temperature, said method comprising the steps of:
   A) providing a reinforcing fiber; and
   B) impregnating said reinforcing fiber with a matrix wherein said matrix comprises:
      a) a resin component comprising a difunctional epoxy resin, a trifunctional meta-glycidyl amine and a tetrafunctional para-glycidyl amine;
      b) a thermoplastic particle component comprising high melting thermoplastic particles that have a melting point above said curing temperature and low melting thermoplastic particles that have a melting point at or below said curing temperature;
      d) a thermoplastic toughening agent;
      e) electrically conducting particles; and
      f) a curing agent wherein said curing temperature is between 140° C. and 200° C.

14. A method for making a pre-impregnated composite material according to claim 13 wherein said high melting thermoplastic particles are selected from the group consisting of polyamide 6 and said low melting thermoplastic particles are selected from the group consisting of copolymers of polyamide 6 and polyamide 12.

15. A method for making a pre-impregnated composite material according to claim 13 wherein said reinforcing fibers are selected from the group consisting of glass, carbon and aramid.

16. A method for making a pre-impregnated composite material according to claim 13 wherein said difunctional epoxy resin is selected from the group consisting of diglycidyl ether of bisphenol F, diglycidyl ether of bisphenol A, diglycidyl dihydroxy naphthalene and combinations thereof.

17. A method for making a pre-impregnated composite material according to claim 13 wherein said electrically conductive particles comprise silver, gold, copper, aluminum, nickel, conducting grades of carbon, buckminsterfullerene, carbon nanotubes, carbon nanofibers, nickel coated carbon particles and/or silver coated copper particle.

18. A method for making a pre-impregnated composite material according to claim 17 wherein said electrically conducting particles comprise one or more conducting grades of carbon.

19. A method for making a pre-impregnated composite material according to claim 13 wherein the amount of said high melting thermoplastic particles in said thermoplastic component is about equal to the amount of said low melting thermoplastic particles in said thermoplastic component.

20. A method for making a pre-impregnated composite material according to claim 13 wherein said toughening agent is selected from the group consisting of polyether sulfone, polyether ethersulfone, polyphenyl sulphone, polysulfone, polyimide, polyetherimide, aramid, polyamide, polyester, polyketone, polyetheretherketone, polyurethane, polyurea, polyarylether, polyarylsulphide, polycarbonate and polyphenylene oxide.

21. A method for making a pre-impregnated composite material according to claim 13 wherein said curing agent is an aromatic amine.

22. A method according to claim 13 that comprises the additional step of curing said pre-impregnated composite material.

* * * * *